US005693222A

United States Patent [19]
Galvan et al.

[11] Patent Number: 5,693,222
[45] Date of Patent: Dec. 2, 1997

[54] APPARATUS AND METHOD FOR IMPROVED HIGH-EFFICIENCY DISSOLVED AIR FLOTATION FLUID PROCESSING

[75] Inventors: Anthony G. Galvan, Sandy, Utah; Ravinder Menon, Richmond, Va.

[73] Assignee: Baker Hughes Incorporated, Houston, Tex.

[21] Appl. No.: 642,556

[22] Filed: May 3, 1996

[51] Int. Cl.[6] .................................................. C02F 1/24
[52] U.S. Cl. ...................... 210/194; 210/199; 210/206; 210/221.2; 210/703; 261/84; 261/93; 366/103
[58] Field of Search .......................... 210/194, 199, 210/206, 221.2; 261/84, 93; 366/103, 104

[56] References Cited

U.S. PATENT DOCUMENTS

| | | |
|---|---|---|
| 2,319,752 | 5/1943 | Smith . |
| 2,772,234 | 11/1956 | Kelly . |
| 2,801,084 | 7/1957 | Krupp . |
| 3,175,687 | 3/1965 | Jones . |
| 3,828,935 | 8/1974 | Rovel . |
| 3,846,299 | 11/1974 | Krasnoff . |
| 3,959,131 | 5/1976 | Ramirez . |
| 4,022,696 | 5/1977 | Krofta . |
| 4,031,006 | 6/1977 | Ramirez . |
| 4,184,967 | 1/1980 | Krofta . |
| 4,216,085 | 8/1980 | Chittenden . |
| 4,305,735 | 12/1981 | Kanak et al. . |
| 4,374,027 | 2/1983 | Severeid . |
| 4,626,345 | 12/1986 | Krofta . |
| 4,681,682 | 7/1987 | White et al. . |
| 4,921,604 | 5/1990 | Moellenbeck . |
| 4,923,600 | 5/1990 | Krofta . |
| 4,931,175 | 6/1990 | Krofta . |
| 5,064,531 | 11/1991 | Wang et al. . |
| 5,068,031 | 11/1991 | Wang et al. . |
| 5,069,783 | 12/1991 | Wang et al. . |
| 5,080,802 | 1/1992 | Cairo, Jr. et al. . |
| 5,084,165 | 1/1992 | Wang et al. . |
| 5,139,662 | 8/1992 | Ozawa . |
| 5,151,177 | 9/1992 | Roshanravan et al. . |
| 5,160,610 | 11/1992 | O'Reilly . |
| 5,188,729 | 2/1993 | Krofta . |
| 5,275,732 | 1/1994 | Wang et al. . |
| 5,306,422 | 4/1994 | Krofta . |
| 5,382,358 | 1/1995 | Yeh . |

OTHER PUBLICATIONS

Article entitled "Treatment And Disposal Of Wastewater Sludges" by P. Aarne Vesilind —p. 92 —Ann Arbor Science Publishers, Inc. —Copyright 1974.
Document entitled "DAF Dissolved Air Flotation" by Serck Baker, Inc.
Brochure entitled "EIMCO Dissolved Air Flotation" by EIMCO Process Equipment Company —Copyright 1983.
Brochure entitled "EIMCO Component Dissolved Air Flotators For Tank Diameters Up To 50 Feet" by EIMCO Process Equipment Company —Copyright 1990.

Primary Examiner—Thomas M. Lithgow
Attorney, Agent, or Firm—Trask, Britt & Rossa

[57] ABSTRACT

A dissolved gas flotation tank system is disclosed which is configured to provide educted gas or air into recirculated effluent fluid from the tank which includes a pump system which increases the dissolution rate of gas into the effluent fluid thereby eliminating the need for retention tanks and related equipment which adds to high equipment costs. The dissolved gas flotation tank system of the present invention also provides a pre-contact chamber for assuring immediate and intimate contact between the suspended solids in an influent feed stream and the recirculated effluent fluid in which gas is dissolved, as well as flocculant when used, to produce a better agglomerate structure for improved flotation and separation. The dissolved gas flotation tank of the present invention also provides an improved means of removing and processing float from the tank, and employs a dewatering system enhanced by the addition of chemicals or flocculants into the float removal system. The DGF tank system of the present invention may include process controls which monitor and regulate selected operation parameters.

17 Claims, 5 Drawing Sheets

1

APPARATUS AND METHOD FOR IMPROVED HIGH-EFFICIENCY DISSOLVED AIR FLOTATION FLUID PROCESSING

BACKGROUND

1. Field of Invention

This invention relates to separation tank systems for the removal of a solid or a liquid component from a fluid component in an influent feed, and specifically relates to dissolved gas flotation tank systems.

2. Statement of the Art

Separation tank systems are used in a wide number of industries to process an influent feed or slurry which contains a solid and liquid component by separating the solid component from the liquid component. Separation tank systems include filtration tanks, settling tanks, clarifier tanks, thickener tanks, flotation tanks, and the like. Most separation tank systems depend on gravity to facilitate the separation process. Flotation tanks, which are most relevant to the present invention, employ gravity separation as well, but are principally structured to receive an influent feed stream into a zone where a gas is introduced into the influent feed for the ultimate production of bubbles. The solids or particulates which are in suspension tend to adhere to the bubbles formed in the influent feed stream and are floated to the top of the tank where most of the gas is released from the bubbles leaving a "float" of solids matter behind. The float is then removed from the top of the tank and the resulting clarified fluid, from which the solid or particulate matter has been separated, is removed from the tank for further processing. Flotation tanks, also referred to herein as "flotation cells," are used in a number of industries to remove solids from suspension, including the wastewater treatment industry, the paper pulp industry, mining and metallurgical industries, the food processing industry and others.

The structure and operation of flotation tanks varies widely depending on the application to which the flotation tank is applied and the type of influent feed being processed. Flotation tanks have in common, however, the introduction of gas bubbles to the influent feed stream so that the suspended solids contact the gas bubbles and adhere to them. Some flotation tank systems introduce gas, such as air, at the bottom of the tank, through such means as a sparger, so that the gas contacts the incoming influent feed. Other flotation tank systems induce gas into the tank volume by establishment of a fluid vortex caused by rotation of the influent feed at the center of the tank.

The type of flotation tank most relevant to the present invention is one which employs dissolved gas as the means for supplying gas bubbles to the influent feed. Dissolved gas flotation systems usually include a retention tank which retains a volume of gas and fluid under pressure. Gas is introduced into the fluid retained in the retention tank at elevated pressures which causes the gas to dissolve into solution. The fluid in which the gas is dissolved is then directed into the flotation tank where a dramatic pressure drop occurs, thus allowing the gas to come out of solution, and bubbles are formed. Suspended solids in the influent feed adhere to the bubbles. Most dissolved air flotation (DAF) systems direct recirculated clarified or processed fluid from the flotation tank to the retention tank to receive the air in solution. Other DAF systems, however, dissolve gas into the influent feed, in whole or in part. Although referred to herein by its conventional term, a "dissolved air flotation" system, it is understood that any suitable gas, including air, may be used in the system and the term "air" is not meant to limit the type of gas which may be used.

Dissolved air flotation systems vary in configuration and operational elements. Specifically, DAF systems vary in the point at which the fluid containing dissolved air is introduced to, or brought into contact with, an influent feed stream, and vary in the means by which gas is introduced into solution or into the retention tank. DAF systems also vary in the means by which float is removed from the flotation tank. Known DAF systems are functional and suitable for their intended purposes, but can be very expensive to construct and operate, both in terms of equipment costs and energy efficiencies.

Thus, it would be advantageous in the industry to provide a dissolved gas flotation system which is designed to effectively eliminate the need for certain known structural elements, such as a retention tank and a source of compressed gas, thereby reducing equipment costs, while maintaining high efficiency in dissolution of gas solution and flotation separation.

SUMMARY OF THE INVENTION

In accordance with the present invention, a dissolved gas flotation system is structured to provide intimate mixing and interaction of influent feed and fluid containing dissolved gas to maximize the separation of suspended solids from a fluid component, to eliminate the need for a retention tank, to provide unique apparatus for educting gas into solution for producing a dissolved gas/fluid solution and to facilitate removal and processing of float. The dissolved gas flotation system may be structured with a programmable logic controller which monitors conditions relevant to the flotation tank system to optimize the separation process. The structure of the present invention may be adapted for use in a variety of industrial applications, but the invention is disclosed herein with respect to processing paper pulp, by way of example.

The dissolved gas flotation (DGF) system of the present invention includes a flotation tank into which an influent feed stream is directed for processing. The flotation tank generally includes apparatus for collecting and removing clarified fluid, or process fluid, from the tank following separation of the suspended solids from the influent feed stream, and includes apparatus for removal of sludge, otherwise referred to herein as "float," which is formed at the top of the flotation tank. The flotation tank may also include apparatus for removing underflow from the bottom of the tank. The DGF system of the present invention most suitably may employ clarified liquid, withdrawn from the flotation tank after separation, as the fluid into which gas is dissolved. However, a source of fluid external to the tank may be use as well for dissolving gas therein. In these respects, the present invention is similar to known DAF systems.

The DGF system of the present invention differs from known or previously disclosed systems, however, in effectively eliminating the need for a retention tank to house fluid during the introduction of gas into solution. The elimination of a retention tank, which presents a significant cost savings in construction of a DGF system, is enabled by the use of a pump having gas eductor structure associated therewith. An in-line static mixer may also be used to increase gas dissolution rates. The pump used to educt gas into the process fluid may be, most suitably, a "self-educting" pump which is structured to educt gas into the pump. That is, a pump may be used in the system which is structured to circulate a liquid stream from the pump which educts gas into the liquid stream prior to re-entering the pump behind the impeller. Alternatively, gas may be educted into the processed fluid recirculation line on the suction side of the pump or on the discharge side of the pump. The use of a pump or other apparatus for educting gas into the fluid line further eliminates the need for expensive equipment to introduce gas into the fluid line, and eliminates the need to provide external gas or gas sources. However, it may be suitable, or even necessary, in some applications to introduce gas under metered conditions, which may be done in the present invention.

Additionally, a multi-stage centrifugal pump having a series of in-line turbines which increases the pressure of the fluid discharged from the pump may be employed in the DGF system of the present invention to assure the mixing of gas or air with the fluid. Alternatively, a single-stage pump may be used. An in-line static mixer may be positioned downstream from the pump to receive fluid and educted gas. The in-line static mixer operates to mix the gas and fluid under increased pressure to dissolve the gas into solution. The dissolved gas and fluid mixture is then directed toward the flotation tank for contact with an influent feed stream.

The DGF system of the present invention is also structured to provide increased contact between the suspended solids in the influent feed stream and the bubbles which form after release of pressure in the dissolved gas/fluid mixture to enhance the adherence of solids with the bubbles. By contrast, in known DAF systems, the dissolved gas/fluid mixture exiting the retention tank is directed into the flotation tank where it is generally discharged in the vicinity of incoming influent feed. Thus, contact between the influent feed and the gas bubbles forming as the gas comes out of solution is random and does not always result in a well formed adherence between the solids particles and the surface of the bubbles.

To enhance the contact between the forming bubbles and the solids in the influent feed stream of the present invention, a pre-contact chamber is provided in association with the flotation tank, preferably externally to the flotation cell. The pre-contact chamber is sized and structured with sufficient inlets to simultaneously receive an influent feed stream, the dissolved gas/fluid mixture and, optionally, a dosage of a chemical (e.g., a flocculant or surfactant) from at least one source. The pre-contact chamber is designed to receive influent feed, the dissolved gas/fluid mixture and other materials (e.g., chemicals or flocculants) in a relatively confined space, thus providing greater contact between those components. The result is an instantaneous formation of solids, or floc particles, (i.e., agglomerates) encapsulated in a packed bubble formation which more readily assures that the solid particulates will remain adhered to the bubbles until floated to the top of the flotation tank.

The pre-contact chamber is in fluid communication with the inner volume of the flotation tank via an inlet pipe. The inlet pipe may be constructed with flow mixing structure which directs the flow of the suspended solids/bubbles/chemical dose mixture from the pre-contact chamber to the inner volume of the flotation tank while also providing structure for keeping the suspended solids/bubbles/chemical dose mixture mixed together prior to entry into the volume of the flotation tank. Such structure may be, for example, a series of baffles which direct flow, but also generate eddies near the periphery of the inlet pipe to facilitate constant and adequate mixing. Once the suspended solids/bubbles/chemical dose mixture enters the volume of the flotation tank, the agglomerate of suspended solids and bubbles floats to the top of the tank where most of the gas in the bubbles is released leaving a float of solids floating on the fluid level in the tank.

The DGF system of the present invention also includes an improved structure and method for removing float from the fluid surface of the flotation tank. The flotation tank of the present invention is structured with a dewatering screw conveyor which is positioned in the flotation tank at the fluid level in the tank. The flotation tank is further structured with structure for moving the float from the surface of the fluid into the screw conveyor. Such structure may be, for example, a rotating skimmer arm positioned just above the surface of the fluid in the tank. The rotating skimmer arm skims the surface of the fluid and moves the float into the screw conveyor, which includes an elongated trough sized to extend from proximate the center of the tank to the outer wall of the tank. A journalled screw mechanism is positioned in the trough and is caused to rotate in a manner which moves the collected float outwardly from the center of the flotation tank.

The screw conveyor of the present invention differs from known systems in providing an apparatus for introducing a chemical (e.g., a flocculant) into the trough of the device while the float is being moved along the conveyor so that the float becomes increasingly more dewatered as it moves outwardly. The screw conveyor is structured to permit the water released from the float to filter, typically by gravity flow, out of the trough for further processing. The fluid is directed away from the screw conveyor into a fluid receiving chamber attached to the screw conveyor trough. The fluid receiving chamber may also be constructed with a screw conveyor which is positioned perpendicularly to, or at an angle to, the screw conveyor of the float trough and is rotated in a direction opposite to the direction of rotation of the screw conveyor of the float trough. The screw conveyor of the fluid receiving chamber allows fluid to be received into the chamber from the float trough, but also keeps any float which may also drop into the fluid receiving chamber out of the fluid receiving chamber by moving the float back out and into the float trough.

The float trough, at its outermost extremity, may be configured with a gradually decreased diameter, and the diameter of the vanes of the screw conveyor may decrease accordingly. The decreased diameter of the float trough and screw conveyor vanes further provides for compacting of the float to dewater the float and release fluid into the fluid receiving chamber. The dewatered float is eventually released out of the float trough near the outermost extremity. The configuration of the float trough and screw conveyor produce a dewatered float which minimizes hydraulic loading rates to the downstream dewatering process. The fluid which is released from the dewatering of the float may be returned to the flotation tank or may be disposed.

The method of processing an influent feed stream through the DGF system of the present invention may be monitored, and thus optimized, by the use of a programmable logic controller (PLC), or similar "intelligent control" apparatus, connected to the DGF system. That is, certain aspects or parameters of the operating system may be monitored and fed back to the programmable logic controller for analysis. Based on the change or fluctuation in any one or more parameters of the operating system, the operation of the DGF system may be modified to maintain a selected operating condition. For example, it may be appropriate to monitor the turbidity of the effluent process fluid withdrawn from the flotation cell as it is recirculated for mixture with educted gas. If the turbidity level of the effluent process fluid is deemed to be too high, then it may be deemed appropriate to increase the amount of gas educted into the line in order to maintain a selected optimum gas:solids ratio in the recirculated fluid. Thus, the PLC can analyze the turbidity level in the effluent, determine if it is too high, and signal the recirculation pump to increase flow capacity for the eduction of more gas.

Some of the parameters which may be most useful and appropriate for monitoring include the rate of influent feed entering the pre-contact chamber, the suspended solids concentration of the influent feed stream, the turbidity of the effluent process fluid, the pressure in the recirculation fluid line and the fluid or back pressure of the fluid in the flotation tank. With those, and any other selected parameters, the PLC may be configured to modify such factors as the operation pressure in the recirculation fluid line, the fluid level in the flotation tank, the eduction of gas into the recirculation fluid line, the release of underflow from the tank or the increase or decrease of chemical (e.g., flocculant or surfactant) dosage to the pre-chamber.

BRIEF DESCRIPTION OF THE DRAWINGS

In the drawings, which currently illustrate what is considered to be the best mode for carrying out the invention.

DETAILED DESCRIPTION OF THE ILLUSTRATED EMBODIMENTS

Figure 1:
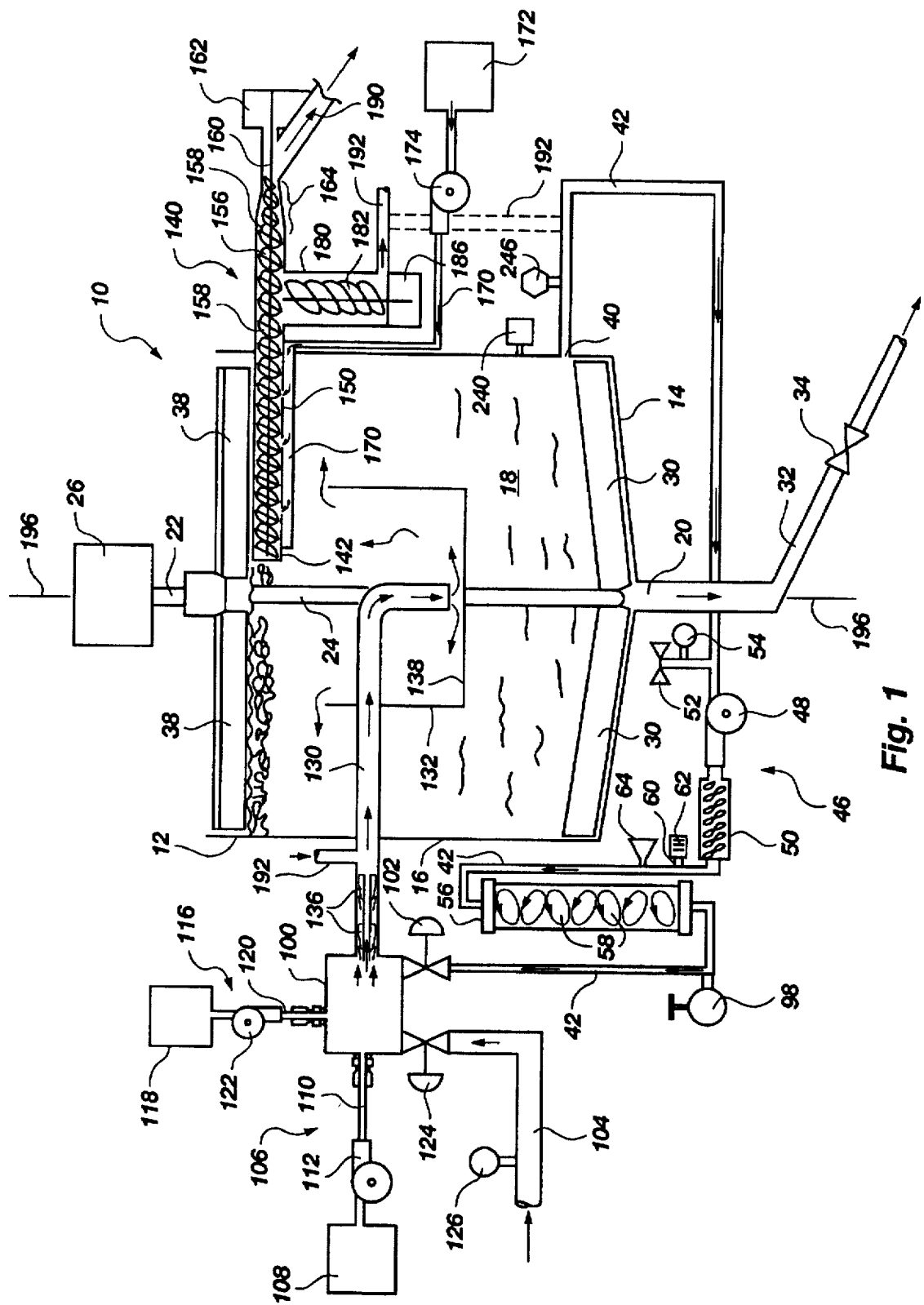
FIG. 1 is a representational view of the dissolved gas flotation system of the present invention.

FIG. 1 illustrates the general structural features of the dissolved gas flotation system 10 of the present invention. The DGF system 10 includes a tank 12 having a bottom 14 and a peripheral wall 16 defining a tank volume 18 therebetween. The configuration of the tank 12 may vary, as well as its size or dimension, but one exemplary tank 12 configuration illustrated in FIG. 1 has a bottom 14 which is sloped downwardly and inwardly toward an underflow outlet 20. The tank 12 may also include a rake drive mechanism 22 positioned in the center of the tank 12. The rake drive mechanism 22 includes a rotatable drive shaft 24 which extends from a drive motor 26 through the depth of the tank 12 to near the underflow outlet 20. Rake arms or squeegees 30 may be secured to the drive shaft 24 and are positioned to scrape or skim the bottom 14 surface of the tank 12 to move solids, which have settled to the bottom 14 of the tank 12 by gravity sedimentation, to the underflow outlet 20. The settled solids are directed away from the tank 12 through an underflow pipe 32 which may have attached thereto an actuation valve 34. The rake drive mechanism 22 also has secured to it, near the top of the tank 12, one or more skimmer arms 38 which rotate about the top of the tank 12 as the drive shaft 24 rotates. The skimmer arms 38 are positioned at the surface of the fluid in the tank 12 to skim or move float from the surface of the fluid, as described more fully below.

The tank 12 may be configured with at least one effluent outlet 40 through which clarified liquid is removed from the volume 18 of the tank 12. Clarified fluid is also referred to herein by the synonymous terms "process fluid" or "effluent." As described more fully below, suspended solids which are entrapped in gas bubble formations (and with flocculants when a flocculant is used) are floated to the top of the tank 12 where most of the gas is released from the bubbles. A float of solids and flocculant material is left on the surface of the liquid. Clarified liquid from which the suspended solids have been separated by the described flotation process comes to reside in the middle and lower zones of the tank 12. Thus, clarified liquid is withdrawn from the zone of the clarified liquid phase formed in the tank 12. Notably, only one effluent outlet 40 is illustrated in FIG. 1. However, more than one effluent outlet 40 may be provided. More than one effluent outlet 40 may be particularly suitable as a means of increasing outflow of effluent from the tank 12 and may be particularly appropriate where the diameter of the effluent outlets are such that a vortex is created at the effluent outlets 40 as the clarified liquid is withdrawn, thereby creating an unacceptable turbulence in the fluid at the point of the effluent outlets 40.

In a particularly suitable embodiment of the present invention, effluent fluid is circulated through a recirculation line 42 which extends from the tank 12 and directs fluid toward the tank 12 again, as described more fully below. However, fluid from a source other than the tank 12 may be used in the present invention as the fluid into which gas is dissolved. The effluent, in such cases, may either be directed downstream for further processing, or may be mixed with fluid from a source other than the tank 12 to provide the fluid medium for gas eduction.

As illustrated, a pump system 46 is in fluid communication with the recirculation line 42. Effluent fluid travels through the pump system 46 to increase the energy in the effluent. Apparatus for educting air into the effluent fluid in the recirculation line 42 is also provided in proximity to the pump system 46. It should be noted that any gas may be educted into the recirculation line 42, including air. Any reference herein to air being educted is not meant to be a limitation to the type of gas which may be educted into the system. Gas is educted into the effluent fluid and is mixed with the effluent fluid under the power of the pump system 46. The configuration of the pump system 46 may vary and the apparatus for educting gas into the effluent fluid may vary in the present invention, while still achieving a high gas dissolution rate of gas into the effluent fluid. Further, although eduction of gas or air into the effluent is a particularly economic and suitable means of carrying out the present invention, it may be necessary or desirable to introduce gas or air into the system by means other than eduction. In such applications, gas or air may be introduced into the system with the aid of a flow meter.

As illustrated in FIG. 1, the pump system 46 may comprise a multi-stage centrifugal pump 48 which includes a series of in-line turbines 50 that increase the energy of the effluent fluid as it travels through the turbines 50. An example of a multi-stage centrifugal pump which may be used in the DGF system 10 of the present invention is a 2800 series Tonkaflo® 14-stage centrifugal pump. As also illustrated, a gas eductor valve 52 may be positioned on the upstream, or suction side, of the pump system 46 so that as the flow velocity of the effluent increases upon entry into the pump 48, gas is educted through the eductor valve 52 and into the effluent fluid. An air flow meter 54 may be connected to the eductor valve 52. The gas and fluid are then mixed as the effluent fluid travels through the pump 48 and the multi-stage turbines 50. A high rate of gas dissolution into the effluent fluid is achieved by the mixing action of the pump system 46. It may be desirable or efficient, however, to employ a conventional centrifugal pump, or so-called "single-stage" pump, in the pump system 46 without the use of a multi-stage turbine 50 system.

Although a sufficiently high rate of gas dissolution into the effluent may be achieved with the use of a single-stage centrifugal pump or a multi-stage centrifugal pump 48 in the pump system 46, it may be necessary or desirable to achieve even higher rates of gas dissolution through the use of an in-line static mixer 56 which is positioned downstream, or on the discharge side, of the pump system 46. An in-line static mixer 56 is constructed with internal baffles 58 or other structure which provide increased surface area against which the fluid and educted gas can flow and mix. The increased surface area provided by an in-line static mixer 56 directly results in an increase in the rate at which gas is dissolved into solution. Therefore, the need for a conventional retention tank is eliminated.

When an in-line static mixer 56 is used in the DGF system 10 of the present invention, a second eductor valve 60 may optionally be positioned on the recirculation line 42 at the downstream, or discharge, end of the pump system 46. The second eductor valve 60 provides an additional amount of gas to the dissolved gas/fluid mixture as it exits the pump system 46 and before it enters into the in-line static mixer 56. A rotameter 62 may be attached to the second eductor valve 60. Further, pressure valve 64 may be connected to the recirculation line 42 as it exits the pump system 46 so that the pressure in the recirculation line 42 can be monitored.

Figure 2:
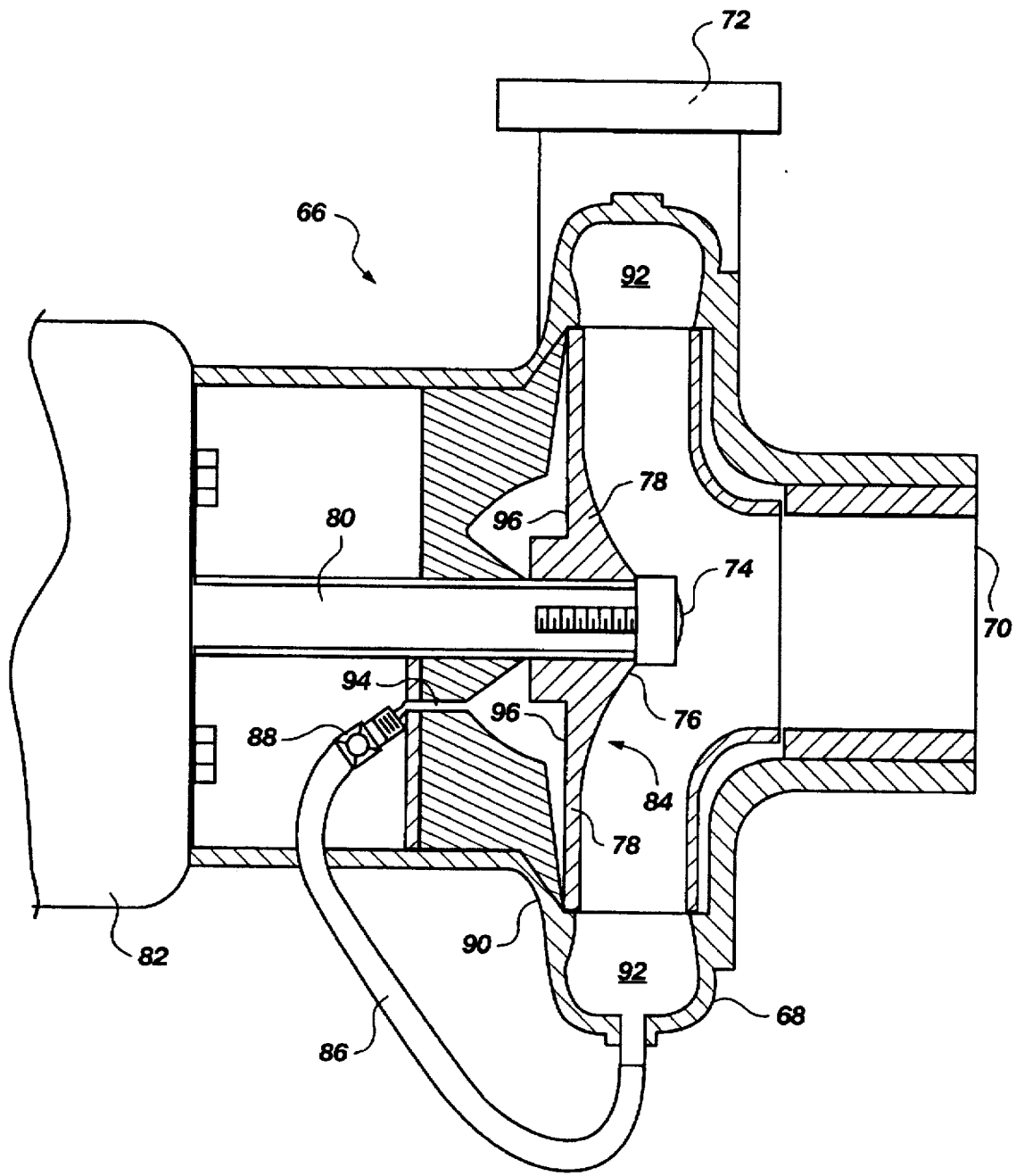
FIG. 2 is an enlarged view in cross section of an gas-educting pump which may be used in the dissolved gas flotation system of the present invention.

In another embodiment of the DGF system 10 of the present invention, the rate of gas dissolution into the effluent by the pump system 46 may be increased even further with the use of a "self-educting" pump which is constructed to educt gas directly into the pump. FIG. 2 illustrates, in cross-section, a simplified self-educting pump 66 which may be used in the present invention. The pump 66 comprises a pump casing 68 which has a fluid inlet 70 and a fluid outlet 72. Fluid is directed into the pump 66 through the fluid inlet 70 where the fluid contacts the eye 74 of the spinning impeller 76. The fluid is then forced outwardly by and along the vanes 78 of the impeller 76. The impeller 76 is connected to a drive shaft 80 which is, in turn, connected to drive motor 82.

It would be theoretically desirable to educt gas into the pump 66 in a manner which would provide immediate contact between the educted gas and the effluent fluid entering into the fluid inlet 70 because such immediate contact would increase the rate of dissolution of gas into solution. However, the introduction of gas into a pump 66, particularly near the eye 74 of the impeller 76, causes derating of the pump 66. That is, air pockets formed near the eye 74 of the impeller 76, or on the front face 84 of the impeller 76, cause the suction power of the pump 66 to drop. Therefore, it is contrary to conventional pump mechanics to introduce air into the pump 66 on the front side of the impeller 76. The immediate contact between gas and fluid can still be achieved within the pump, however, through the self-educting pump 66 illustrated in FIG. 2.

The self-educting pump 66 is structured with a fluid stream hose 86 which connects with the periphery of the pump casing 68 and connects to a ball check valve 88 positioned at the back side 90 of the pump casing 68. The fluid stream hose 86 draws off a stream of fluid from the interior 92 or volute of the pump 66. The stream of fluid is under pressure as it moves through the fluid stream hose 86 toward the ball check valve 88. Due to the pressure in the fluid stream, gas is educted into the ball check valve 88. The fluid stream and educted air then moves into the pump casing 68 via conduit 94. The educted gas and fluid stream enters into the interior 92 of the pump 66, on the back side 96 of the impeller 76. The gas and fluid stream are forced outwardly by the impeller 76 toward the volute of the pump interior 92 where it mixes with effluent fluid entering into the pump 66 through fluid inlet 70. No educted gas contacts the front face 84 of the impeller 76 so no derating of the pump 66 occurs. Yet, gas is educted into the fluid from the back side 96 of the impeller 76 and provides immediate contact and mixing of gas and fluid. The increased shear achieved by the self-educting pump 66 may lessen, or even eliminate, the need for an in-line static mixer 56 in the DGF system 10 of the present invention.

Fluid into which educted gas has been dissolved by action of the in-line static mixer 56 and/or the pump system 46 is directed out of the in-line static mixer 56 through the next section of the recirculation line 42. A line pressure actuation valve 98 may be connected to the recirculation line 42 downstream from the in-line static mixer 56 to control the flow, and ultimately the recirculation, of the dissolved gas/fluid mixture in recirculation line 42. The dissolved gas/fluid mixture is then directed into a pre-contact chamber 100 for intimate contact with an influent feed stream. The flow of dissolved gas/fluid mixture into the pre-contact chamber 100 may be controlled by a back pressure actuation valve 102. The pre-contact chamber 100 of the present invention is sized and configured to receive the dissolved gas/fluid mixture from the recirculation line 42 as it exits the in-line static mixer 56 or pump system 46 (in an embodiment where no in-line static mixer 56 is employed), to receive an influent feed stream from an influent feed conduit 104 and to receive, optionally, a dosage of chemical from at least one primary source 106 of chemical. The primary chemical source 106 may be a tank or reservoir 108 which contains a chemical substance for introduction into the influent feed stream and dissolved gas/fluid mixture. Such chemicals may include chemical flocculants, such as polymeric materials, or may be buffer solutions, fluid catalysts, surfactants or any other desired additive.

The reservoir 108 of the primary chemical source 106 is in fluid communication with the pre-contact chamber 100 by a fluid conduit 110. A metering pump 112 may be associated with the fluid conduit 110 to increase the flow velocity of the chemical as it enters the pre-contact chamber 100 or to keep the chemical mixed or agitated. A secondary chemical source 116 may also be provided for introducing an additional dosage of the same chemical contained in the reservoir 108 of the primary chemical source 106, or to introduce an entirely different chemical into the influent feed stream and dissolved gas/fluid mixture entering the pre-contact chamber 100. The secondary chemical source 116 may also have a reservoir 118 for containing a chemical material. The reservoir 118 is in fluid communication with the pre-contact chamber 100 via a fluid conduit 120 positioned therebetween. A metering pump 122 may also be positioned between the reservoir 118 and the fluid conduit 120 to deliver chemical to the pre-contact chamber 100.

Again, the pre-contact chamber is sized and configured to provide intimate and immediate contact between the dissolved gas/fluid mixture as it enters from the recirculation line 42 and the influent feed stream as it enters from the influent feed conduit 104. The flow of influent feed into the pre-contact chamber 100 may be controlled by an actuator valve 124 connected to the influent feed conduit 104. Further, it may be desirable to position a flow meter 126 on the influent feed conduit 104 to monitor the flow rate of the influent. As the dissolved gas/fluid mixture enters the pre-contact chamber 100, a pressure release occurs and the gas comes out of solution. Bubbles immediately form and contact the suspended solids in the influent feed stream. It has been shown that such immediate contact between the bubbles and the suspended solids of the influent feed provide a more stable adhesion of the suspended solids to the bubbles. More importantly, it has been shown that intimate and immediate contact between the suspended solids and bubbles, as provided by the pre-contact chamber 100, produces a gas bubble/suspended solids structure where the bubble is embedded in the suspended solids/flocculant structure. A suspended solids/bubble structure of that type is more stable and assures flotation of the suspended solids to the top of the tank 12.

A flocculant may or may not be added from the primary chemical source 106 or secondary chemical source 116, depending on several factors including the concentration suspended solids in the influent feed stream, the flotation or separation rate and the turbidity of the effluent fluid. Any one of those factors, or other factors, may indicate the need for the addition of a dose of flocculant, but indiscriminate use of flocculants is to be avoided. Where flocculant is added, however, it has been shown that the pre-contact chamber is effective in producing a suspended solids/flocculant structure as the flocculant contacts the suspended solids, and that the suspended solids/flocculant structure is more stably formed with embedded bubbles therein, as previously described.

The pre-contact chamber 100 is connected to an influent pipe 130 which enters into the tank 12 and into a feed chamber 132. The influent pipe 130 may optionally be structured with a series of baffles 136 positioned within the influent pipe 130 which provide a further means for keeping the suspended solids/bubbles/chemical mixture mixed together as it enters the feed chamber 132. The baffles 136 are preferably sized and configured to provide gentle mixing, or to establish eddy currents in the influent pipe 130, but are also structured to avoid causing excessive turbulence in the mixture of the kind that would shear or tear the suspended solids/bubble/floc structure (i.e., the agglomerates). The suspended agglomerates and fluid travelling through the influent feed pipe 130 enter into the feed chamber 132 and are typically directed toward the bottom 138 of the feed chamber 132 to impose quiescence in the fluid as it rises toward the top of the tank 12.

As the agglomerates and fluid enter into the tank 12, the reduced specific gravity of the agglomerates causes the agglomerates to rise to the top of the fluid in the tank 12 and the liquid (e.g., water), having a greater specific gravity, is directed downwardly in the tank 12. As the agglomerates float on the surface of the fluid in the tank 12, most of the gas or air is released leaving behind a float of solid matter and flocculant. The rotating skimmer arms 38 sweep across the surface of the fluid in the tank 12 and push the float into a screw conveyor-float trough 140 which is positioned at the top of the tank 12 at about the fluid level.

Figure 3:
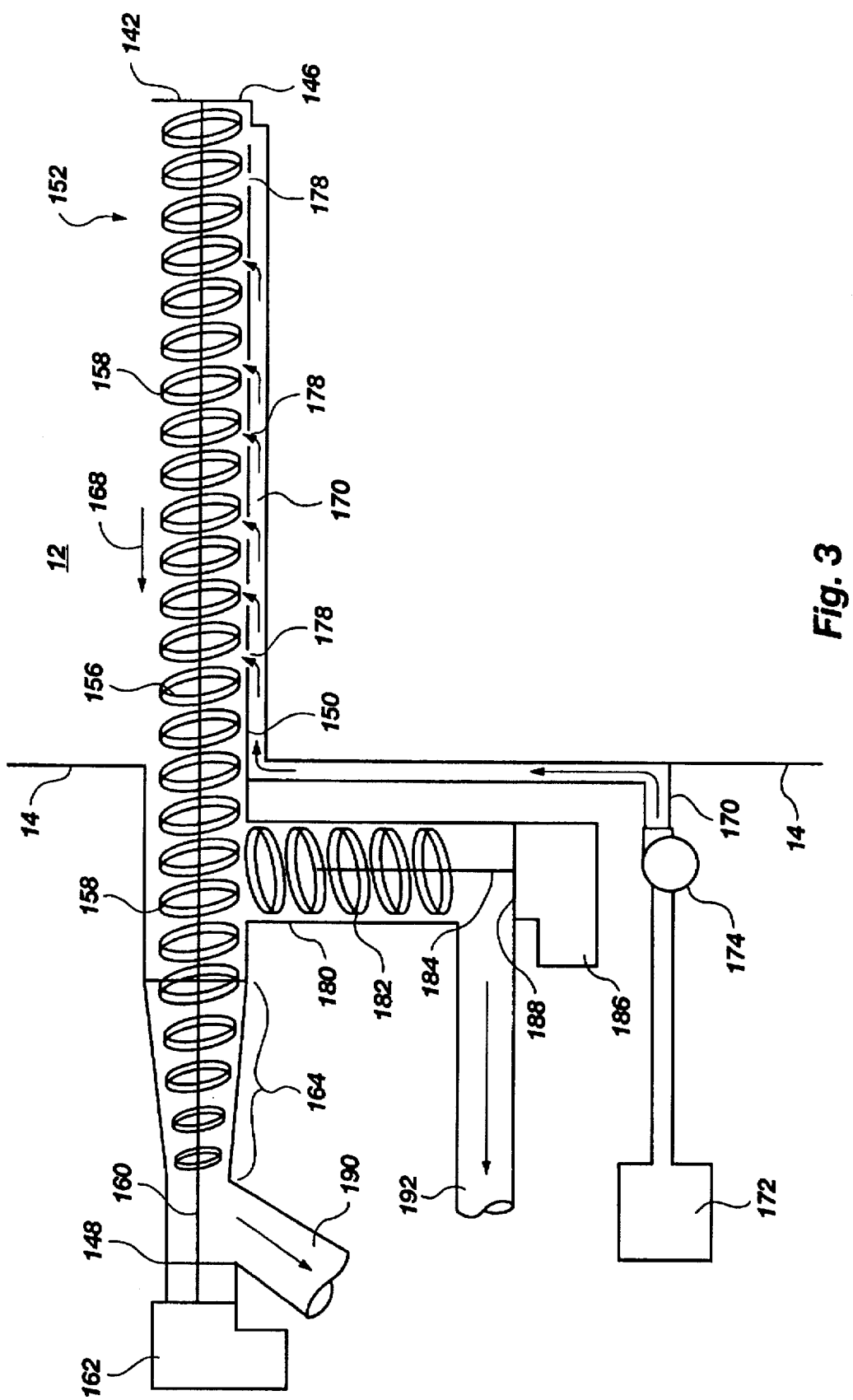
FIG. 3 is an enlarged view in elevation of the screw conveyor-float trough shown in FIG. 1.

The screw conveyor-float trough 140 of the present invention provides an improved mode of removing float from the tank 12. As seen more clearly in FIG. 3, the screw conveyor-float trough 140 includes an elongated trough 142 which has elongated sides 144 (FIG. 4), a first end 146 oriented within the tank 12, a second end 148 positioned external to the tank 12 and a bottom 150. The elongated trough 142 has an open top 152 into which float is swept by the rotating skimmer arms 38.

The elongated trough 142 is sized to retain a screw conveyor 156 which has spiralling vanes 158 that radiate outwardly from a drive shaft 160 which is journalled between the first end 146 and second end 148 of the elongated trough 142. The drive shaft 160 is connected to a drive motor 162 positioned near the second end 148 of the elongated trough 142 which causes the drive shaft 160, and thus the vanes 158 of the screw conveyor, 156 to rotate.

The elongated trough 142 narrows in a zone 164 positioned near the second end 148 of the elongated trough 142 such that the cross-sectional dimension of the elongated trough 142 in zone 164 is less than the cross-sectional dimension of the elongated trough 142 near the first end 146. As float is urged into the screw conveyor-float trough 140 by the skimmer arms 38, the float contacts the rotating screw conveyor 156 and is moved in the direction of arrow 168 away from the interior of the tank 12. The screw conveyor-float trough 140 of the present invention is further structured with a chemical conduit 170 through which a chemical, typically a flocculant, is pumped from a chemical source 172 by pump 174. The chemical conduit 170 is positioned along the bottom 150 of the elongated trough 142, and the chemical is pumped into the elongated trough 142 through apertures 178 formed in the bottom 150 of the elongated trough 142. The addition of a chemical (e.g., flocculant) to the float being moved through the elongated trough 142, in concert with the movement of the float by the screw conveyor 156, causes fluid in the float to be released.

The fluid released from the float is directed into a fluid receptacle 180 which is sized to retain a second screw conveyor 182 therein. The drive shaft 184 of the second screw conveyor 182 is connected to a drive motor 186 which is positioned near the lower end 188 of the fluid receptacle 180. The second screw conveyor 182 is oriented to turn in a direction opposite the direction of rotation of the screw conveyor 156 in the elongated trough 142. Thus, as fluid released from the float drains into the fluid receptacle 180, any float which also drains or drops into the fluid receptacle 180 contacts the second screw conveyor 182 which keeps the float moving upwardly toward the elongated trough 142 for re-deposit therein. The narrowing of the elongated trough 142 in zone 164 also aids in compressing the float moving therethrough to dewater the float. The dewatered float is then removed from the screw conveyor-float trough 140 through a sludge conduit 190 positioned near the second end 148 of the elongated trough 142.

Although the screw conveyor-float trough 140 is illustrated as being oriented substantially horizontally relative to the tank 12, the screw conveyor-float trough 140 may be angled inwardly and downwardly toward the central axis 196 of the tank 12 in an effort to employ gravity as a means of removing the fluid released from the float. An angled screw conveyor-float trough 140 as described may require some modification in the skimmer arm structure to assure removal of float into the float trough, and would require some modification or repositioning of the fluid receptacle 180 to receive the released fluid.

The fluid, which is released from the float, exits the fluid receptacle 180 through a conduit 192 which may be connected to the system, such as to the influent pipe 130 (FIG. 1) near the pre-contact chamber 100, to introduce the reclaimed fluid back into the influent feed. In the alternative, the reclaimed fluid may be removed from the DGF system 10 for disposal or further processing. In yet another alternative configuration, the conduit 192 may be connected to the recirculation line 42, as suggested in phantom in FIG. 1, so that the reclaimed fluid may be recirculated with the effluent from the tank 12.

Figure 4:
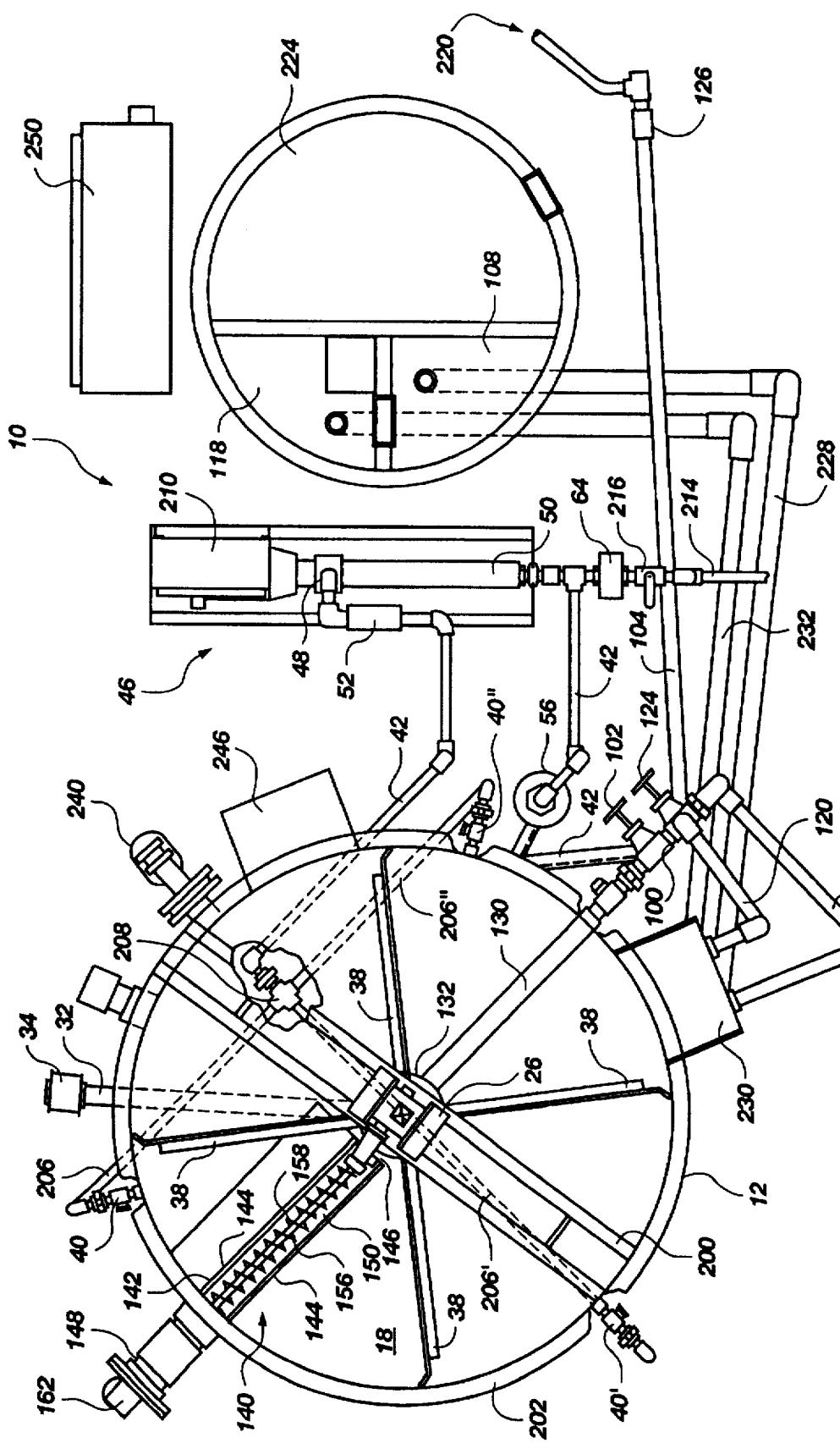
FIG. 4 to a plan view of one embodiment of the dissolved gas flotation system of the present invention.

The structure and configuration of the DGF system 10 of the present invention may be more fully understood with reference to FIG. 4 which illustrates many of the features already described, in addition to some features not previously described. Specifically, the tank 12 is shown having a bridge 200 spanning the diameter of the tank 12 and being secured to the upper rim 202 of the tank 12. The bridge 200 serves as support for the drive motor 26 which causes rotation of the skimmer arms 38 and the rake drive mechanism (not shown in FIG. 4). The feed chamber 132 may also be connected to or suspended from the bridge 200.

The DGF system 10 illustrated in FIG. 4 depicts a tank 12 configuration having three effluent outlets 40, 40', 40" emerging from the tank 12. Each effluent outlet 40, 40', 40" is connected to an effluent conduit 206, 206', 206" which directs effluent toward a confluent point 208 where the effluent streams merge and enter into the recirculation line 42. The effluent fluid passes through the recirculation line 42 and through the eductor valve 52 until it enters the pump system 46 comprising, as illustrated, a multi-stage centrifugal pump 48 and turbines 50. The pump motor 210 which drives the pump system 46 can be seen in FIG. 4. The pump system 46 may also have associated therewith a pump discharge pipe 214 which allows effluent fluid to be discharged out of the system under conditions which dictate that such action should be taken, such as when a determination is made that the fluid level in the tank 12 is too great. Discharge of effluent fluid through the pump discharge pipe 214 may be controlled manually or automatically at valve 216.

As illustrated in FIG. 4, the dissolved gas/fluid solution which has passed through the pump system 46 and in-line static mixer 56 is directed through the remainder of the recirculation pipe 42 to the pre-contact chamber 100. The flow of an influent feed stream also enters the pre-contact chamber 100 through influent feed conduit 104 from a source of influent feed, represented at 220. A flow meter 126 on the influent feed conduit 104 monitors the flow rate of the influent feed stream. In the embodiment of the DGF system 10 illustrated in FIG. 4, a chemical tank 224 is in fluid communication with the pre-contact chamber 100 to supply chemicals (e.g., flocculant) thereto through metering pumps (not shown).

The chemical tank 224 is divided into two reservoirs 108, 118 which serve as the primary and secondary source of chemicals to the DGF system 10. Chemical material from the primary reservoir 108 may be directed through a first chemical pipe 228 which connects to a pump housing 230 which houses the metering pump 112 of the primary chemical source 106 (FIG. 1). The chemical is pumped through the metering pump 112 (not shown in FIG. 4) and exits through fluid conduit 110 into the pre-contact chamber 100. Chemical material from the secondary reservoir 118 may be directed through a second chemical pipe 232 which connects to the pump housing 230 which also houses the metering pump 122 of the secondary chemical source 116 (FIG. 1). The chemical is pumped through the metering pump 122 (not shown in FIG. 4) and exits through fluid conduit 120 into the pre-contact chamber 100.

Various parameters or operating conditions of the DGF system 10 of the present invention may be monitored and/or controlled through additional structures associated with the DGF system 10. For example, a differential pressure gauge 240, seen in FIGS. 1 and 4, may be attached to the tank 12 and be in fluid communication with the volume 18 of the tank 12 so that the pressure within the tank at any given time can be determined. Through monitoring the differential pressure in the tank 12, the fluid level in the tank 12 can be monitored and controlled by, for example, opening actuation valve 34 on the underflow pipe 32 to release fluid through the underflow pipe 32. The turbidity of the effluent fluid exiting the tank 12 through the recirculation line 42 may also be monitored by a turbidity meter 246 (i.e., a Hach turbidity meter), illustrated in FIGS. 1 and 4. Evaluation of the turbidity level of the effluent assists in determining whether the recirculation of effluent should be increased or decreased to maintain a selected gas-to-solids ratio.

The monitoring and control of various parameters of the DGF system 10 can be undertaken by a process controller 250 which is associated with the DGF system 10, as represented in FIG. 4. The process controller 250 may be configured for proportional integral derivative (PID) control responses with programmable logic control (PLC). The process controller 250 may essentially consist of a microprocessor-based device which monitors and displays such process variables as temperature, pressure, flow rate and liquid level in the tank. Which parameters or variables may be monitored is selected by the DGF system personnel. The type of control output may also be selected from several different types, including 4–20 mA dc.

Figure 5:
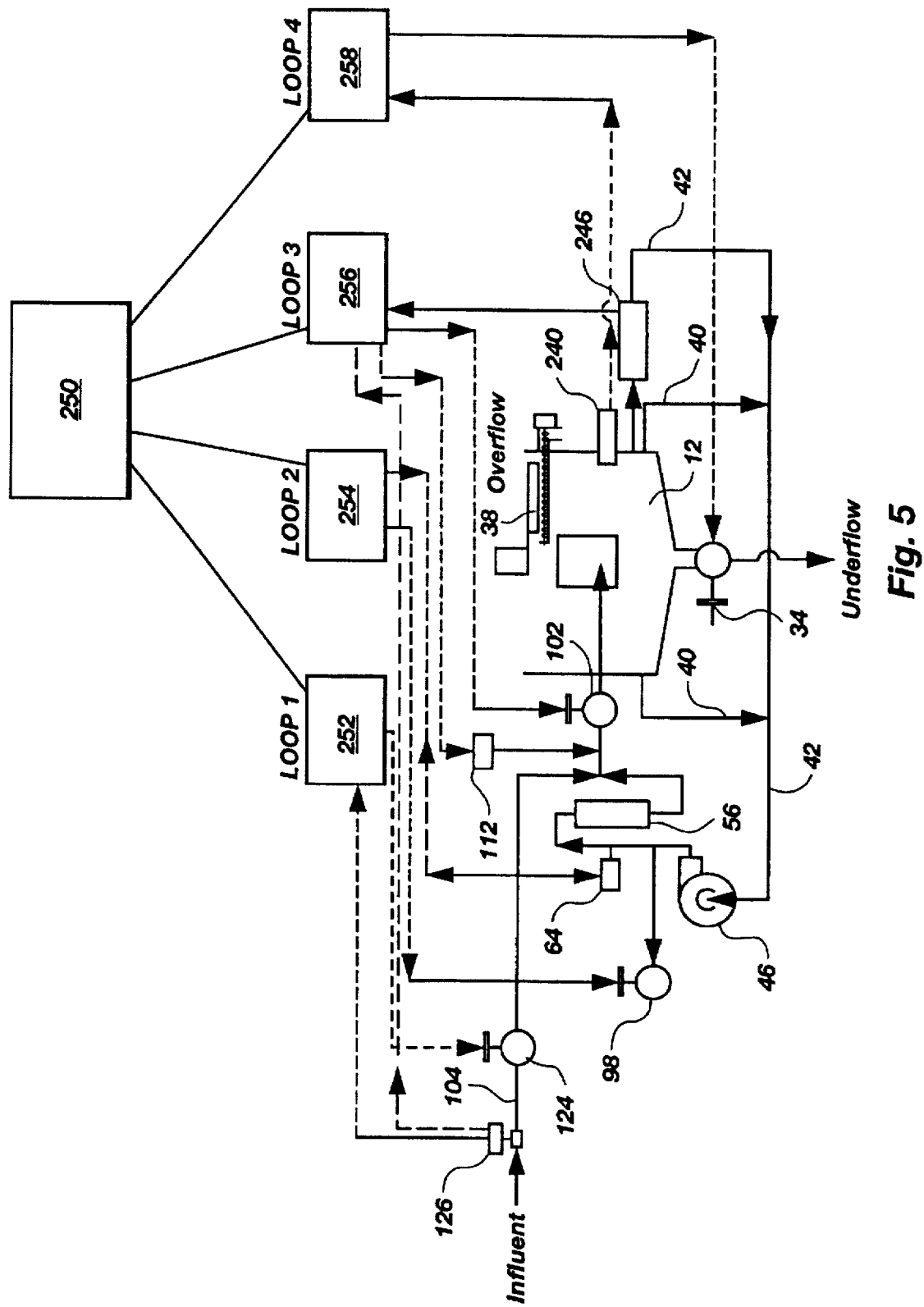
FIG. 5 is a schematic illustration of a dissolved gas flotation system of the present invention having an exemplar process controller associated therewith.

An example of how the process controller 250 may be used to monitor and control the DGF system 10 of the present invention is shown representationally in FIG. 5 where the major elements of the invention are illustrated. As illustrated, the process controller 250 may be configured with control logic which consists of four loop controllers 252, 254, 256, 258, each of which monitor and regulate different operational parameters of the DGF system 10. The first loop controller 252 may be configured to monitor and regulate the flow of influent feed into the DGF system 10. Thus, the first controller 252 may be in electrical communication with the flow meter 126 attached to the influent feed conduit 104. The flow meter 126 may, most suitably, be capable of generating, for example, a 4–20 mA signal (either amps or voltage) which is sent to the first controller 252. If the signal received from the flow meter 126 indicates that the flow of influent feed has varied from a selected flow rate (e.g., 100 gpm [gallons per minute]), then a signal may be sent from the first controller 252 to the actuator valve 124 connected to the influent feed conduit 104 to either increase or decrease the flow of influent feed.

The logic of the second controller 254 may, for example, be configured to monitoring and regulating the differential pressure in the recirculation line 42 in accordance with a selected optimal level. To that end, the second controller 254 may be in electrical communication with the pressure gauge 64 attached to the recirculation line 42. The pressure gauge 64 may generate a 4–20 mA signal which is sent to the second controller 254 to indicate the line pressure at selected intervals of time (e.g., a signal is generated every three minutes). If the second controller 254 receives a signal indicating that the line pressure has varied from a selected differential pressure (e.g., 65 psig), then the second controller 254 may signal the back pressure gauge 98 to open, relieving some of the pressure in the line until the selected differential pressure (e.g., 65 psig) is achieved again as indicated by signals received in the second controller 254 from the pressure gauge 64.

The logic of the third controller 256 may, for example, be configured to monitoring and controlling the proper amount of gas required in the recirculation line 42 responsive to a subnatant turbidity level. That is, the third controller 256 may be in electrical communication with the turbidity meter 246 attached to the recirculation line 42. As effluent leaves the tank 12 through the recirculation line 42, it is monitored by the turbidity meter 246 to determine the relative clarity of the effluent. If the turbidity meter 246 determines that the turbidity level is above a selected level (e.g., greater than 40 NTU [nephelometric turbidity units]), which is indicative of a greater level of solids in the effluent, the third controller 256 may be configured to send a signal to the metering pump 112 of the primary chemical source 106 to increase the dosage of flocculant. The increased flocculant dosage will then increase the suspended solids agglomeration rate resulting in a decrease in turbidity level of the effluent.

Alternatively, the third controller 256 may, for example, be configured to maintaining a selected gas-to-solids ratio (i.e., pounds of gas to pounds of solids) in order to optimize flotation separation. Therefore, when the flow meter 126 determines that the flow of the influent feed is above a selected level, the third controller 256 may send a signal to the back pressure actuator valve 102 to increase the rate of recirculation, and thus increase the amount of gas educted into the system so that the gas-to-solids ratio is maintained within a selected percentage known to optimally provide separation of the suspended solids in the flotation process.

The logic of the fourth controller 258 may, for example, be configured to maintaining a selected fluid level in the tank 12 commensurate with the size and configuration of the tank 12, and may provide consistent and efficient hydraulic loading in the DGF system 10. Thus, the differential pressure gauge 240 (or level indicator) connected to the tank 12 may be in electrical communication with the fourth controller 258 and may generate a 4–20 mA signal which indicates that the pressure (or level) in the tank exceeds a selected set point value. Responsive to the signal from the differential pressure gauge 240, the forth controller 158 may send a signal the a the actuator valve 34 on the underflow conduit 32 signalling the actuator valve 34 to open, thereby allowing fluid to drain from the tank 12 in order to maintain a selected fluid level in the tank 12. When the differential pressure gauge 240 (or level indicator) determines that a selected pressure (or level) within the tank 12 has been achieved, the forth controller 258 may respond by signalling the actuator valve 34 to close again.

The configuration of the process controller 250, and the operational parameters which may be monitored and regulated as described above, are merely by way of example and are not a limitation of the kind or the extent of monitoring and control which may be imposed on the DGF system 10. The parameters which are selected for monitoring, and the degree of regulation imposed on the structures of the DGF system, are dictated by the particular application to which the DGF system of the present invention is put.

The DGF system of the present invention is structured to provide rates of gas dissolution into a solution which are comparable to, or which exceed, the dissolution rates achieved with known dissolved air flotation tank systems which employ retention tanks, air panels and other systems structures which add to excessive equipment costs and result in poor energy efficiencies. The DGF system of the present invention employs the use of educted gas or gas, in combination with a pump system and, optionally, an in-line static mixer, to increase the mixture of educted gas and fluid and to reduced retention time of fluid in the system, all of which eliminates the need for a retention tank and other expensive equipment. The DGF system also employs an improved means of removing and processing float from the tank which increases even further the efficiency of the DGF system. The DGF system also employs an improved means of producing bubble-embedded agglomerates with suspended solids which lead to better flotation separation. Thus, reference herein to specific details of the illustrated embodiments is by way of example and not by way of limitation. It will be apparent to those skilled in the art that many modifications of the basic illustrated embodiments may be made without departing from the spirit and scope of the invention as recited by the claims.

What is claimed is:

1. A dissolved gas flotation tank system comprising:

a tank having a top, a bottom and an interior volume for receiving an influent feed stream therein;

an influent feed pipe positioned to direct influent feed into said tank;

a recirculation line extending from said tank to said influent feed pipe, said recirculation line being positioned to receive effluent from said tank for transport through said recirculation line;

a pump in fluid communication with said recirculation line and positioned at a distance upstream from said tank to provide sufficient residency time in said recirculation line to facilitate dissolution of gas into said effluent;

gas addition apparatus positioned to deliver gas directly into said pump at a low pressure zone thereof to avoid derating of the pump; and a float processing system positioned near said top of said tank, said float processing system comprises a float trough containing a screw conveyor therein, said float trough being configured to receive a flocculant therein for contact with float received into said float trough and having a fluid receptacle for receiving fluid released from said float, wherein said receptacle contains a rotatable screw therein.

2. The dissolved gas flotation tank system of claim 1 further comprising a pre-contact chamber in fluid communication with said influent feed pipe sized and configured to receive simultaneously an influent feed stream, effluent from said pump containing dissolved gas in solution and a quantity of chemical.

3. The dissolved gas flotation tank system of claim 2 further comprising an in-line static mixer for increasing dissolution of said gas into said effluent, said in-line static mixer being positioned downstream from said pump to receive effluent fluid containing dissolved gas.

4. The dissolved gas flotation tank system of claim 2 further comprising baffle apparatus positioned between said pre-contact chamber and said tank for mixing said influent feed stream, said effluent from said pump containing dissolved gas in solution and said quantity of chemical.

5. The dissolved gas flotation tank system of claim 1 further comprising electronic process control apparatus for monitoring and regulating selected operational parameters of said tank.

6. A dissolved gas flotation tank system comprising:

a tank having a top, a bottom and an interior volume for receiving an influent feed stream therein;

an influent feed pipe positioned to direct influent feed into said tank;

a recirculation line extending from said tank to said influent feed pipe, said recirculation line being positioned to receive effluent from said tank for transport through said recirculation line;

a pump system in fluid communication with said recirculation line to introduce gas directly into a pump, for dissolving gas into said effluent, said pump system further comprises a multiple stage chaos a series which has a series of in-line turbines for increasing the energy of the effluent in the recycle line;

a pre-contact chamber in fluid communication with said influent feed pipe sized and configured to receive simultaneously an influent feed stream, effluent from said pump system containing dissolved gas in solution and a quantity of chemical; and a float processing system positioned near said top of said tank for processing float material which is removed from said tank.

7. The dissolved gas flotation tank system of claim 6 further comprising an in-line static mixer positioned between said pump system and said pre-contact chamber for further dissolving said educted gas into said effluent.

8. The dissolved gas flotation tank system of claim 7 wherein said float processing system comprises a float trough sized to house a screw conveyor therein, said float trough being configured to receive a flocculant therein for contacting with float received into said float trough and having a fluid receptacle for receiving fluid released from said float.

9. The dissolved gas flotation tank system of claim 8 wherein said fluid receptacle is sized to house a rotatable screw conveyor therein.

10. The dissolved gas flotation tank system of claim 7 wherein said pump system comprises a pump configured with gas introduction apparatus connected to said pump for introducing gas into said pump at a low pressure zone of said pump for dissolution of said gas into said effluent flowing through said pump system.

11. The dissolved gas flotation tank system of claim 6 further comprising electronic process control apparatus for monitoring and regulating selected operational parameters of said tank.

12. A dissolved gas flotation tank system comprising:

a tank having a top, a bottom and an interior volume for receiving an influent feed stream therein;

an influent feed pipe positioned to direct influent feed into said tank;

a recirculation line extending from said tank to said influent feed pipe, said recirculation line being positioned to receive effluent from said tank for transport through said recirculation line;

a pump system in fluid communication with said recirculation line for dissolving gas into said effluent, said pump system including a centrifugal pump having an impeller with an eye and a volute;

gas introduction apparatus connected to said pump for introducing gas directly into said pump away from said volute and the eye of the impeller;

a pre-contact chamber in fluid communication with said influent feed pipe sized and configured to receive an influent feed stream, effluent from said pump system containing dissolved gas in solution and a quantity of chemical;

a fluid conduit positioned to deliver said quantity of chemical to said pre-contact chamber; and a float processing system positioned near said top of said tank.

13. The dissolved gas flotation system of claim 12 further comprising an in-line static mixer for increasing the dissolution of said gas into solution in said effluent.

14. The dissolved gas flotation system of claim 12 wherein said pump system comprises a centrifugal pump and a series of turbines.

15. The dissolved gas flotation system of claim 12 wherein said float processing system is a screw conveyor and float trough structured to dewater float as it moves through said screw conveyor.

16. The dissolved gas flotation system of claim 15 wherein said float trough is configured to receive a flocculant therein.

17. The dissolved gas flotation system of claim 12 further comprising electronic process control apparatus for monitoring and regulating selected operational parameters of said tank.

* * * * *

UNITED STATES PATENT AND TRADEMARK OFFICE
CERTIFICATE OF CORRECTION

PATENT NO. :  5,693,222
DATED      :  December 2, 1997
INVENTOR(S) : Galvan et al.

It is certified that error appears in the above-identified patent and that said Letters Patent is hereby corrected as shown below:

In column 5, line 41-42, change "ther-ebetween" to --there-between-- (to properly hyphenate the word);

In column 9, line 20, before "suspended" insert --of--;

In column 13, line 33, change "the a" to --to--; and

In column 15, line 1, after "stage" delete --chaos a series-- and insert therefore --centrifugal pump--.

Signed and Sealed this

Twentieth Day of April, 1999

Attest:

Attesting Officer

Q. TODD DICKINSON

Acting Commissioner of Patents and Trademarks